United States Patent [19]

Moakler et al.

[11] 3,936,782

[45] Feb. 3, 1976

[54] AUTOMATIC TRANSFER SWITCH

[75] Inventors: William A. Moakler, Basking Ridge; Charles Stotz, Upper Montclair, both of N.J.

[73] Assignee: Automatic Switch Company, Florham Park, N.J.

[22] Filed: Jan. 29, 1975

[21] Appl. No.: 545,052

[52] U.S. Cl. .................................. 335/161; 307/64
[51] Int. Cl.² ........................................... H01H 9/20
[58] Field of Search .............. 335/161; 307/64, 113

[56]   References Cited
       UNITED STATES PATENTS

| | | | |
|---|---|---|---|
| 2,861,198 | 11/1958 | Soos, Jr. | 307/64 |
| 3,132,255 | 5/1964 | Spinelli et al. | 307/64 |
| 3,246,100 | 4/1966 | Russell | 335/161 |

*Primary Examiner*—Harold Broome
*Attorney, Agent, or Firm*—Alan H. Levine

[57] ABSTRACT

An automatic transfer switch having two sets of phase switches, one set for connection between a normal power source and a load and the other set for connection between an emergency power source and the load. The transfer switch also includes two neutral switches, one for connection between the normal source neutral and the load neutral, and the other for connection between the emergency source neutral and the load neutral. Only one set of the phase switches can be closed at any one time, and during transfer of the load from one source to the other both sets of phase switches are open. Prior to a transfer operation, the neutral switch corresponding to the closed set of phase switches is closed and the neutral switch corresponding to the open set of phase switches is open. During transfer of the load, both neutral switches are closed before the closed set of phase switches open and both neutral switches remain closed until after the closed set of phase switches open and the open set of phase switches close. Thereafter, the neutral switch which had originally been open remains closed and the neutral switch which had originally been closed opens.

12 Claims, 14 Drawing Figures

AUTOMATIC TRANSFER SWITCH

This invention relates to automatic transfer switches which are used to automatically transfer an electrical load from a normal source of electric power to an emergency source of electric power upon the happening of some predetermined event.

Automatic transfer switches are typically multi-pole switches. Thus, an automatic transfer switch used with a three phase, four wire system will always include three poles for switching the three phase conductors of the load between the three phase conductors of the normal power source and the three phase conductors of the emergency power source. The fourth, neutral conductor of the load is often permanently connected to the neutral conductors of the normal and emergency sources.

In certain instances, it has been found that the neutral conductors of the load, normal source, and emergency source, should not be permanently connected together. One such instance involves the situation in which a ground fault detector is associated with the normal source. In such a case, it is possible that the interconnected and grounded normal source and emergency source neutral conductors can produce a situation in which a ground fault in the normal source will not be sensed by the ground fault detector. To overcome this problem, it is desirable to use a fourth pole of the transfer switch to transfer the load neutral from one power source to the other when the transfer switch operates.

Transferring the neutral has, however, caused its own problems. Although theoretically all four poles of the transfer switch operate simultaneously, as a practical matter it is impossible to insure that all four switches, namely, the three phase switches and the one neutral switch, connecting the load to a power source will open at precisely the same time. If it should happen that the neutral switch opens even an instant before the phase switches, severely unbalanced voltages may be applied to the load causing damage to it. Furthermore, in such a circumstance there may even be danger to personnel.

It is therefore an object of the present invention to provide an automatic transfer switch having provision for disconnecting the load neutral from the neutral of the power source from which the load is disconnected, and for transferring the load neutral to the alternative power source when the transfer switch is operated, but which nevertheless insures that the load neutral is never disconnected from a power source while the phase conductors of the load are still connected to that power source.

It is another object of the invention to provide an automatic transfer switch in which at the time of a transfer operation the load neutral is connected to the neutrals of both the normal and emergency sources prior to disconnecting the load from the source to which it has been connected, and in which the load neutral remains connected to the neutrals of both the normal and emergency sources until after the load has been connected to the alternative source, after which the load neutral is disconnected from the neutral of the source to which the load had been connected.

It is a further object of the invention to provide an automatic transfer switch wherein the switches which transfer the phase conductors of the load from one source to the other, and the switches which transfer the neutral conductor of the load from one source to the other are operated by the same actuating means.

Additional objects and features of the invention will be apparent from the following description, in which reference is made to the accompanying drawings.

The invention will be described in connection with a three phase, four wire system in connection with which a four-pole automatic transfer switch is employed. However, it is understood that the invention has utility with other types of systems as well. Three poles of the transfer switch are used to control power to the three phase conductors of the load, and the fourth pole of the transfer switch controls connection of the load neutral conductor.

Figure 1:
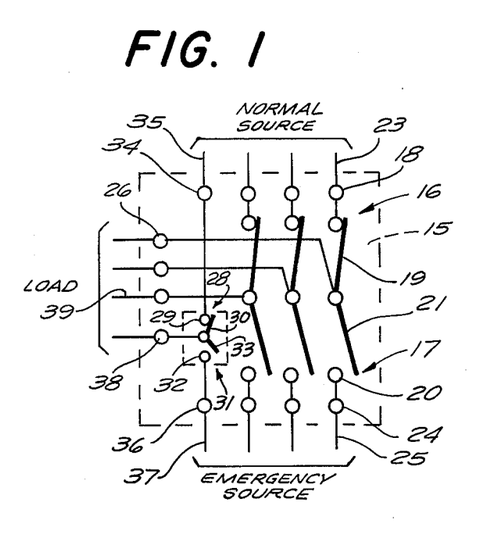
FIG. 1 is a schematic diagram of an automatic transfer switch according to the present invention.

In the schematic illustration of FIG. 1, the automatic transfer switch 15 chosen to illustrate the present invention includes a set of three phase switches 16 for connecting a normal source of electric power, such as that provided by an electric utility, to a load, a set of three phase switches 17 for alternatively connecting an emergency source of electric power, such as may be provided by a local engine-generator arrangement, to the load. Each of the switches 16 includes a stationary contact 18 and a movable contact 19, and each of the switches 17 includes a stationary contact 20 and a movable contact 21. Each stationary contact 18 is electrically connected to a terminal 22 of the transfer switch which can be connected to a phase conductor 23 of the normal source. Each of the stationary contacts 20 is electrically connected to a terminal 24 of the transfer switch which can be connected to a phase conductor 25 of the emergency source. The movable contact 19 of each of switches 16 is electrically connected to the movable contact 21 of one of the switches 17, and each interconnected pair of movable contacts 19 and 21 is electrically connected to a terminal 26 of the transfer switch. Terminal 26 can be connected to a phase conductor 39 of the load.

Automatic transfer switch 15 also includes a neutral switch 28, having a stationary contact 29 and a movable contact 30, and a neutral switch 31 having a stationary contact 32 and a movable contact 33. Stationary contact 29 is electrically connected to a terminal 34 of the transfer switch which can be connected to the neutral conductor 35 of the normal source. Stationary contact 32 is electrically connected to a terminal 36 of the transfer switch which can be connected to the neutral conductor 37 of the emergency source. Movable contacts 30 and 33 are electrically interconnected and both are electrically connected to a terminal 38 of the transfer switch which can be connected to the neutral conductor 39 of the load.

Figure 2:
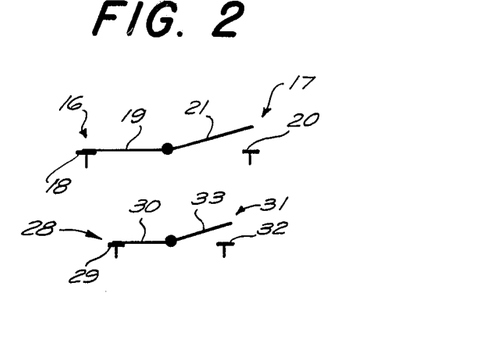
FIGS. 2–6 are schematic diagrams illustrating the operation of the phase switches and neutral switches of the automatic transfer switch.

FIGS. 2–6 illustrate schematically how the movable contacts 19, 21, 30, and 33 move in relation to each other. Initially, as shown in FIGS. 1 and 2, the three phase switches 16 are closed, as is neutral switch 28, and the three phase switches 21 are open, as is neutral switch 31. In other words, each movable contact 19 engages its respective stationary contact 18, movable contact 30 engages stationary contact 28, each of the movable contacts 21 is separated from its respective stationary contact 20, and movable contact 33 is separated from stationary contact 32. Consequently, the load is connected to the normal source and disconnected from the emergency source. Assume now that for some reason the load is to be disconnected from a normal source and connected to the emergency source. This may be because the normal source has failed or because a ground fault has been detected in the normal source.

Figure 3:
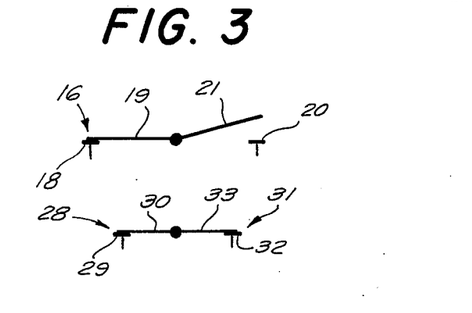
Figure 4:
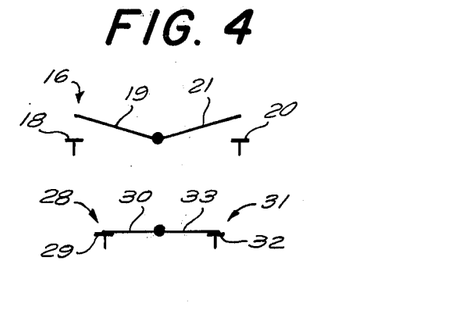
Figure 5:
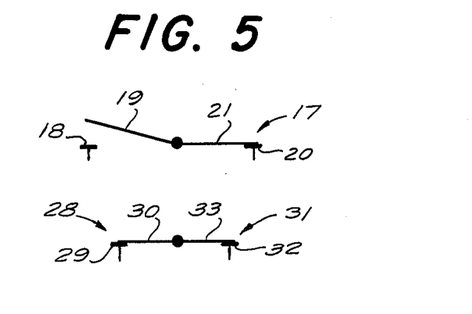
Figure 6:
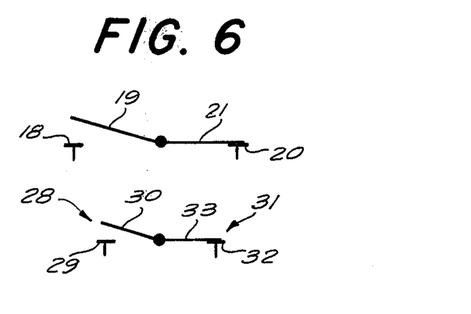

The first step in the transfer operation, as illustrated in FIG. 3, is that neutral switch 31 closes before phase switch 16 opens and while neutral switch 28 remains closed. Next, as shown in FIG. 4, phase switches 16 open while both neutral switches 28 and 31 remain closed. As a result, the load is now disconnected from the normal source, although it has not yet been connected to the emergency source. Following this, as shown in FIG. 5, phase switches 17 close while neutral switches 28 and 31 remain closed. As a result, the load is now connected to the emergency source. Finally, as indicated in FIG. 6, neutral switch 28 opens and neutral switch 31 remains closed. As a result, the load neutral is now disconnected from the normal source neutral, while the load phase and neutral conductors are connected to the emergency source phase and neutral conductors. In retransferring the load from the emergency source to the normal source, the same sequence of steps is followed, except in the reverse order.

It will be appreciated from the above description that the closing of neutral switches 28 and 31 overlaps the opening and closing of the phase switches 16 and 17. Thus, both neutral switches 28 and 31 are closed, to connect the load neutral to both the normal and emergency source neutrals, from before the time the load phase conductors are disconnected from the normal source phase conductors until after the time the load phase conductors are connected to the emergency source phase conductors.

A transfer switch according to the present invention is shown in more detail in FIGS. 7–10. The transfer switch includes a base 42 upon which four upstanding brackets 43, 44, 45, and 46 are mounted. Pivotally mounted on bracket 46 by means of a pin 47 is a generally W-shaped arm 48, and pivotally mounted on bracket 45 by pin 49 is a similar arm 50. Extending between arms 48 and 50, and fastened to the arms, are a pair of non-conductive plates 51 and 52.

Figure 7:
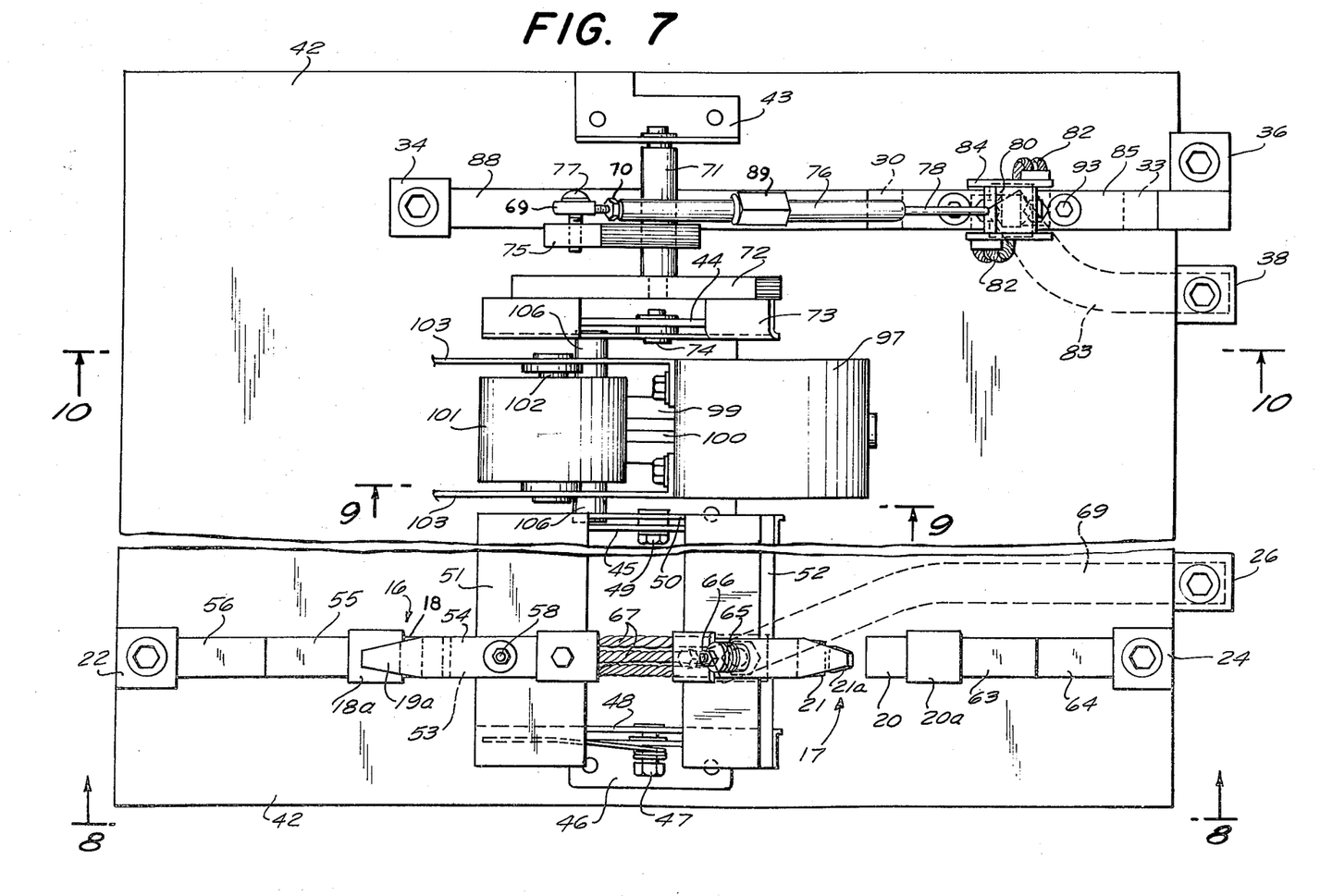
FIG. 7 is a fragmentary plan view of an illustrative automatic transfer switch according to the present invention.
Figure 8:
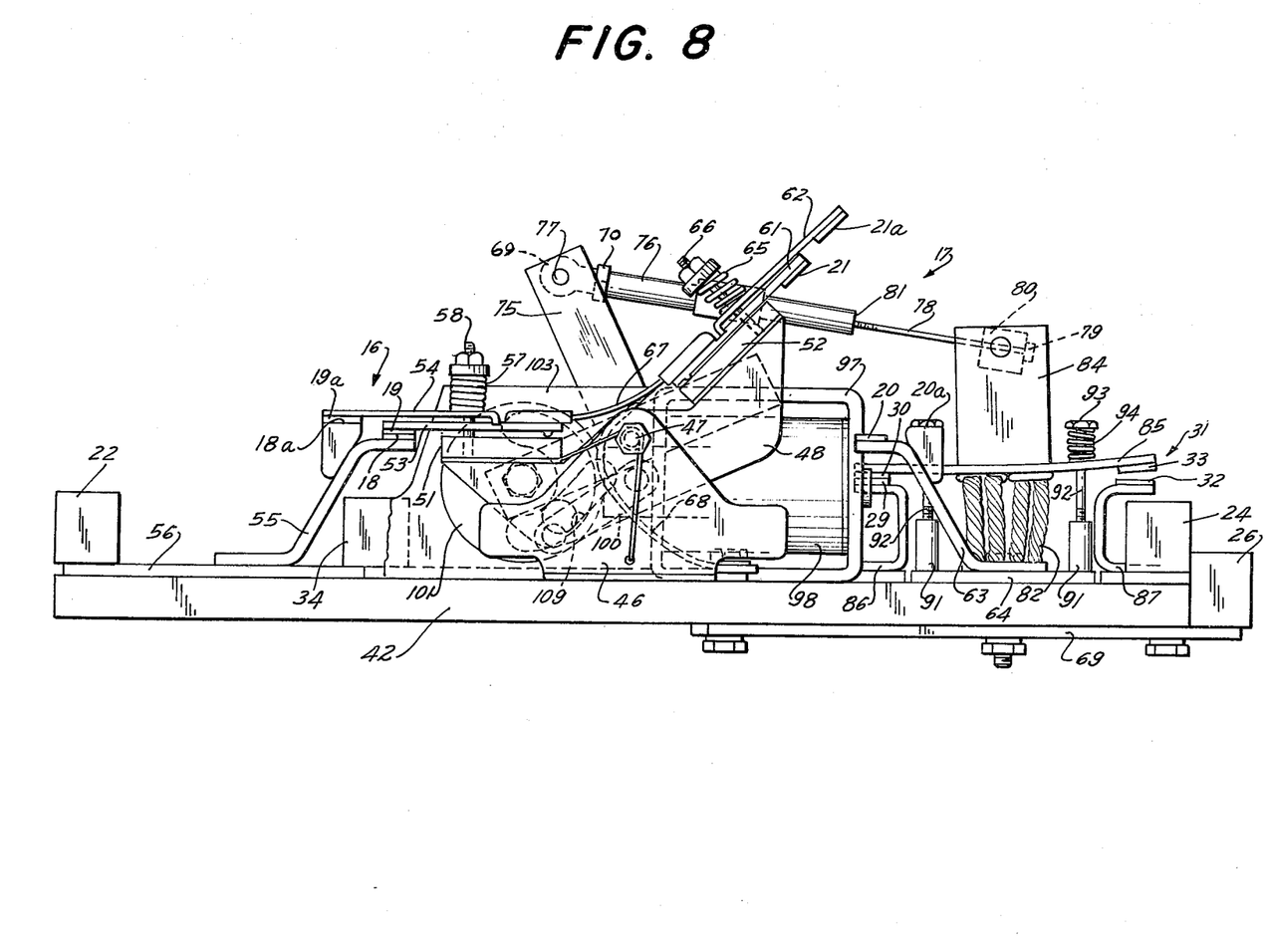
FIG. 8 is an elevational view of the automatic transfer switch taken along line 8—8 of FIG. 7.

Plate 51 carries three main contact arms 53, only one being shown in FIGS. 7 and 8, and three arcing contact arms 54, only one being shown in FIGS. 7 and 8, one arcing contact arm 54 being arranged over each main contact arm 53. Although separate arcing contacts are shown in this example, they may not be required in some transfer switch designs. Each main contact arm 53 carries a movable contact 19 which cooperates with a stationary contact 18, and each arcing contact arm 54 carries a movable arcing contact 19a which cooperates with a stationary arcing contact 18a. Stationary contacts 18 and 18a are mounted on an S-shaped bracket 55 fixed to base 42. Bracket 55, which is electrically conductive, is electrically connected to terminal 22 by an electrical conductor 56. Movable contacts 19 and 19a are yieldingly urged toward their respective stationary contacts 18 and 18a by a compression spring 57 surrounding a post 58 projecting upwardly from plate 51 through holes in contact arms 53 and 54.

In a manner identical to that described with respect to plate 51, plate 52 carries three main contact arms 61, only one being shown in FIGS. 7 and 8, and three arcing contact arms 62. Each main contact arm 61 carries a movable contact 21 cooperable with a stationary contact 20 mounted on an S-shaped bracket 63 fixed to base 42 and electrically connected by conductor 64 to terminal 24. Contacts 21 and 21a are resiliently urged toward their respective stationary contacts 20 and 20a by a compression spring 65 surrounding a post 66 projecting upwardly from plate 52 through holes in contact arms 61 and 62. Main contact arms 53 and 61, and therefore also arcing contact arms 54 and 62, are electrically interconnected by flexible conductors 67. These conductors are electrically connected by additional flexible conductors 68 (FIG. 8) to a conductor 69 (FIG. 7) which in turn is connected to terminal 26.

In FIGS. 7 and 8, phase switches 16 are shown closed and phase switches 17 are shown open. It will be appreciated that by swinging arms 48 and 50 in a clockwise direction and FIG. 8 about the axis defined by pins 47 and 49, switches 16 will be opened and switches 17 will be closed. The manner in which arms 48 and 50 are pivoted will be described below.

As best seen in FIG. 7, projecting in cantilever fashion from bracket 43 is a rod 71, the rod being pivotable about its longitudinal axis with respect to bracket 43. Fixed at its center to the free end of rod 71 is a bar 72 (see also FIG. 10). Secured to, and movable with, bar 72 is a W-shaped arm 73, the center of arm 73 being pivotally secured by pin 74 to bracket 44.

Fixed to, and projecting radially from, rod 71 is a lever 75 (FIGS. 7, 8, and 10) to the free end of which one end of a rod 76 is pivotally connected by a screw 77 passing freely through an eyelet 69. The eyelet is threaded into that one end of rod 76, and fixed in place with respect to the rod by a nut 70. An insulator 89 forms the middle portion of rod 76. Threaded into the other end of rod 76 is an elongated pin 78 having a head 79. Pin 78 is slidably arranged within an opening in a bearing block 80, head 79 of pin 78 and end 81 of rod 76 serving as two spaced-apart abutments which cooperate with bearing block 80 for a purpose to be described below.

Bearing block 80 is carried between two upstanding arms of a U-shaped bracket 84 mounted on an electrically conductive bar 85. At its opposite ends, bar 85 carries the movable contacts 30 and 33 of neutral switches 28 and 31, respectively. The center of bar 85 is electrically connected to terminal 38 of the transfer switch by flexible conductors 82 and conductor 83. Mounted on base 42 beneath bar 85 are two channel-shaped members 86 and 87, member 86 carrying stationary contact 29 of neutral switch 28, and member 87 carrying the stationary contact 32 of neutral switch 31. The arrangement is such that contacts 29 and 30 can engage each other and contacts 32 and 33 can engage each other. Bracket 86 is electrically connected by conductor 88 to terminal 34, and bracket 87 is electrically connected to terminal 36.

Adjacent to members 86 to 87, base 42 carries two upstanding posts 91, into each of which an elongated bolt 92 is threaded, each bolt passing through a hole in bar 85. The head 93 of each bolt 92 is spaced above bar 85, and a compression coil spring 94 surrounds each bolt and bears against head 93 and bar 85. Springs 94 serve to constantly resiliently urge bar 85 downwardly, and therefore urge movable contacts 30 and 33 into engagement with their respective stationary contacts 29 and 32. Thus, in the absence of other forces, both neutral switches 28 and 31 are closed by springs 94.

Located between brackets 44 and 45 is an open-sided housing 97 (FIGS. 7–9) containing an electrical solenoid 98. Solenoid 98 contains an axially-movable armature 99, and suitable conductors (not shown) for applying an electrical signal to the solenoid to energize it. Armature 99 is pivotally connected by a link 100 to a cylindrical weight 101 rotatably carried by a pin 102 extending between two walls 103 extending from housing 97.

A second pin 106 extends through weight 101 parallel to pin 102, but eccentric with respect to the axis of rotation defined by pin 102. Pin 106 extends beyond the contours of weight 101 and through arcuate slots 107 (FIG. 9) in walls 103. One end of pin 106 extends into a short straight slot 108 (FIG. 10) in arm 73, and the other end of pin 106 extends into a similar short straight slot 109 (FIGS. 8 and 11–14) in arm 50. Pin 106 is slideable within slots 108 and 109.

Figure 9:
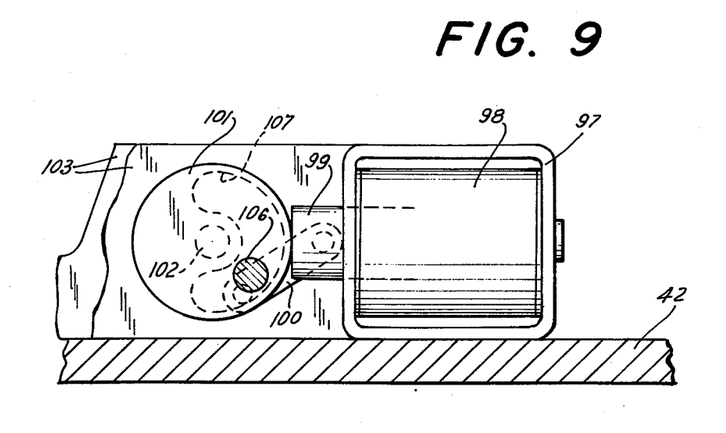
FIG. 9 is a fragmentary cross-sectional view taken along line 9—9 of FIG. 7.
Figure 10:
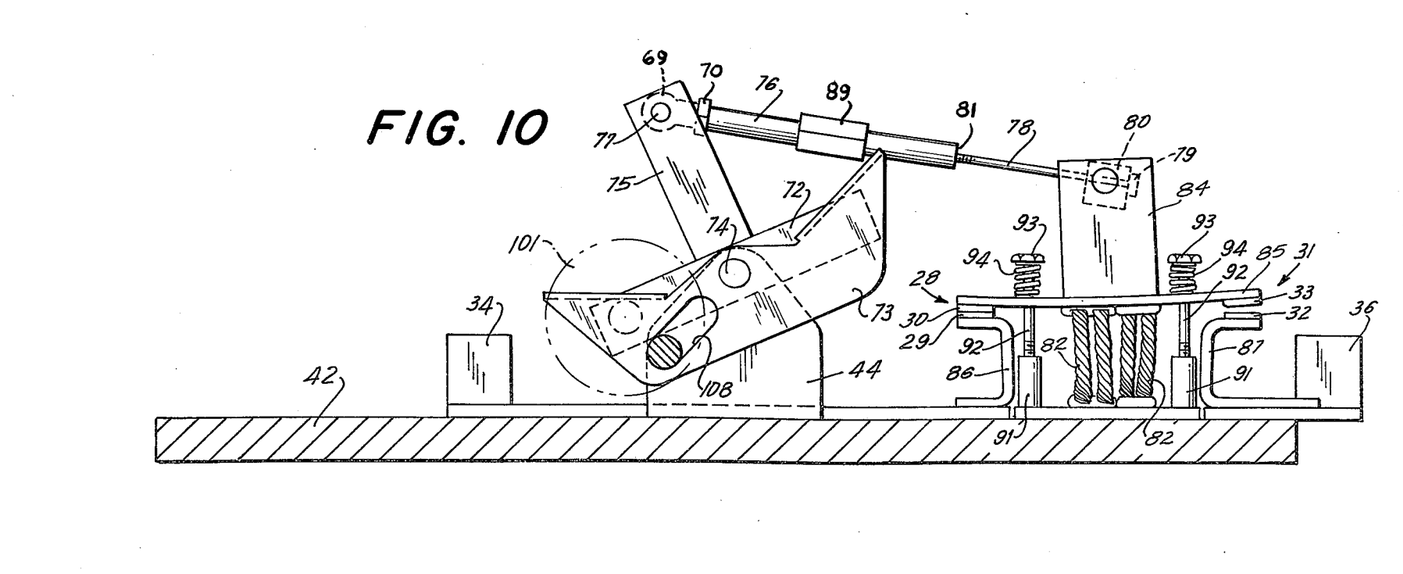
FIG. 10 is a cross-sectional view taken along line 10—10 of FIG. 7.
Figure 11:
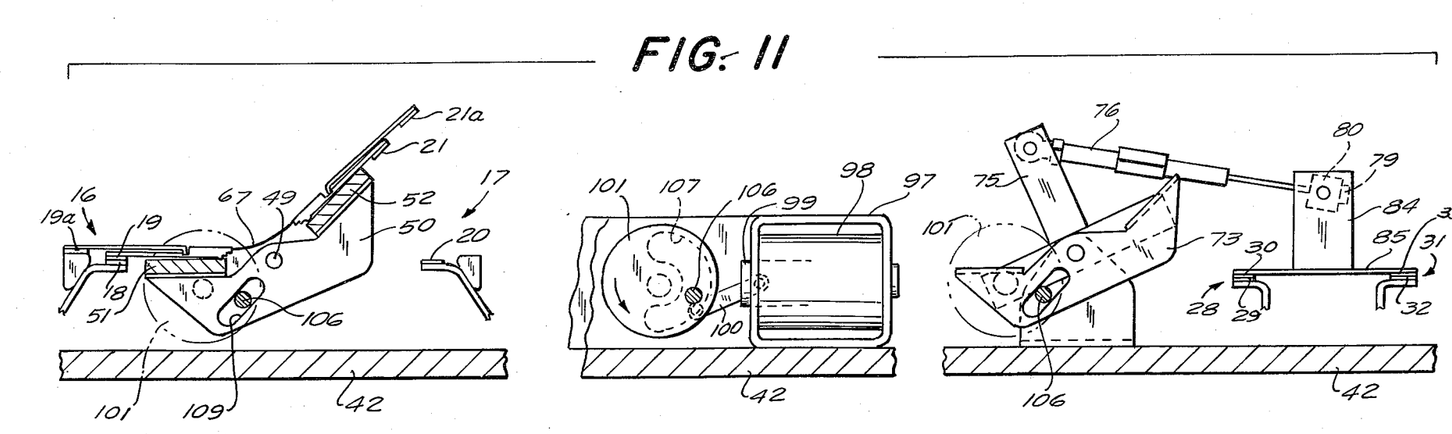
FIGS. 11–14 are fragmentary cross-sectional views illustrating four stages during a transfer operation.

Weight 101 is pivotable between two extreme positions, one of which is illustrated in FIGS. 9–11. When solenoid 98 is energized for an instant, armature 99 moves into the solenoid, i.e., toward the right in FIG. 9, causing weight 101 to rotate counterclockwise in FIG. 9. Upon deenergization of solenoid 98, the inertia of weight 101 causes its continued rotation to its other extreme position illustrated in FIG. 14. The difference between these two extreme positions can be seen by comparing the location of pin 106 in FIGS. 9–11 and in FIG. 14. Should solenoid 98 be energized again, weight 101 is returned to its original position shown in FIGS. 9–11.

FIGS. 7–10 illustrate the position of the parts of the transfer switch when the load is connected to the normal source and disconnected from the emergency source. Thus, phase switches 16 and neutral switch 28 are closed, and phase switches 17 and neutral switch 31 are open. The reason that neutral switch 31 is open is that head 79 of pin 78 has engaged bearing block 80 and pivoted bar 85 slightly in a counterclockwise direction in FIG. 10, against the force of springs 94, so as to separate movable contact 33 from stationary contact 32.

The operation of the transfer switch during transfer of the load from the normal source to the emergency source may best be seen in FIGS. 11–14. Each of these figures includes three views of different parts of the transfer switch at a particular instant of time. All the views show weight 101 and its pin 106. In addition, the left view shows phase switches 16 and 17, the central view shows solenoid 98, and the right view shows neutral switches 28 and 31 and the operating linkage for these switches.

Upon energization of solenoid 98, armature 99 beings to move inwardly (compare FIGS. 9 and 11), and during this initial movement weight 101 is rotated through a short distance in a counterclockwise direction. This initial rotation of weight 101 does not effect opening of phase switches 16 or closing of phase switches 17, as may be seen in FIG. 11. However, this initial rotation is transmitted through arm 73 and lever 75 to cause rod 76 to move slightly to the right, as a result of which head 79 moves toward the right. This small movement permits springs 94 to bring movable contact 33 into engagement with stationary contact 32 and hence close neutral switch 31. Thus, both neutral switches 28 and 31 are closed, although phase switches 16 have not yet opened.

Figure 12:
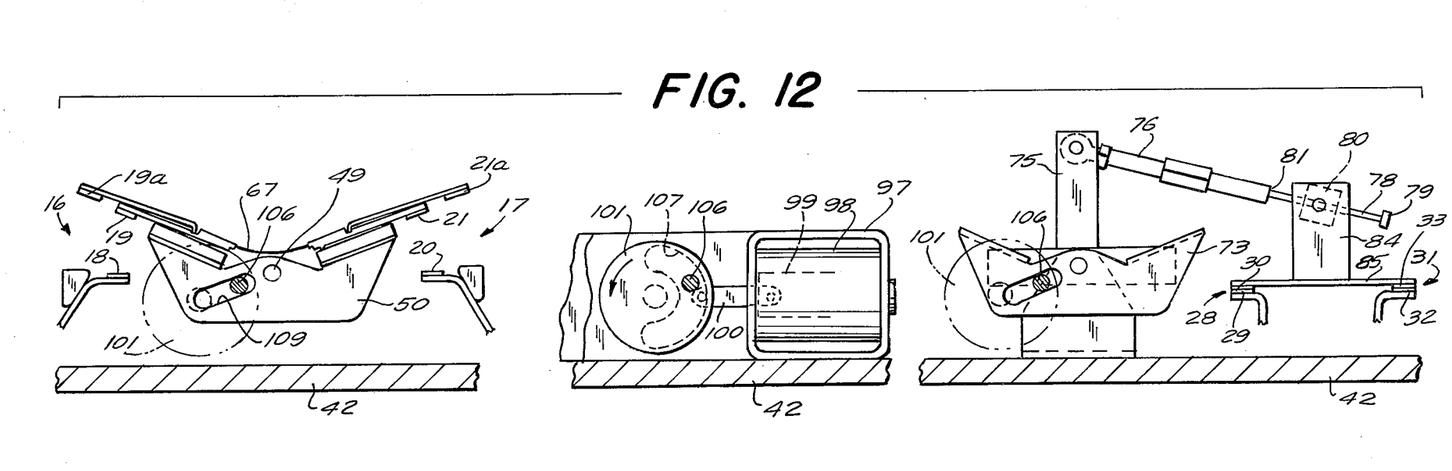

By the time armature 99 is pulled-in to its greatest extent, as shown in FIG. 12, weight 101 has rotated further and pin 106 sliding in slot 109 of arm 50 causes arms 48 and 50 to pivot in a clockwise manner about the axis defined by pins 47 and 49. Consequently, phase switches 16 open and phase switches 17, while still open, are on their way toward being closed. At the same time, pin 78 slides through the hole in bearing block 80 thereby moving head 79 away from the bearing block and moving end 81 of rod 76 toward the bearing block. However, this movement does not have any effect on bar 85, and hence neutral switches 28 and 31 remain closed.

Figure 13:
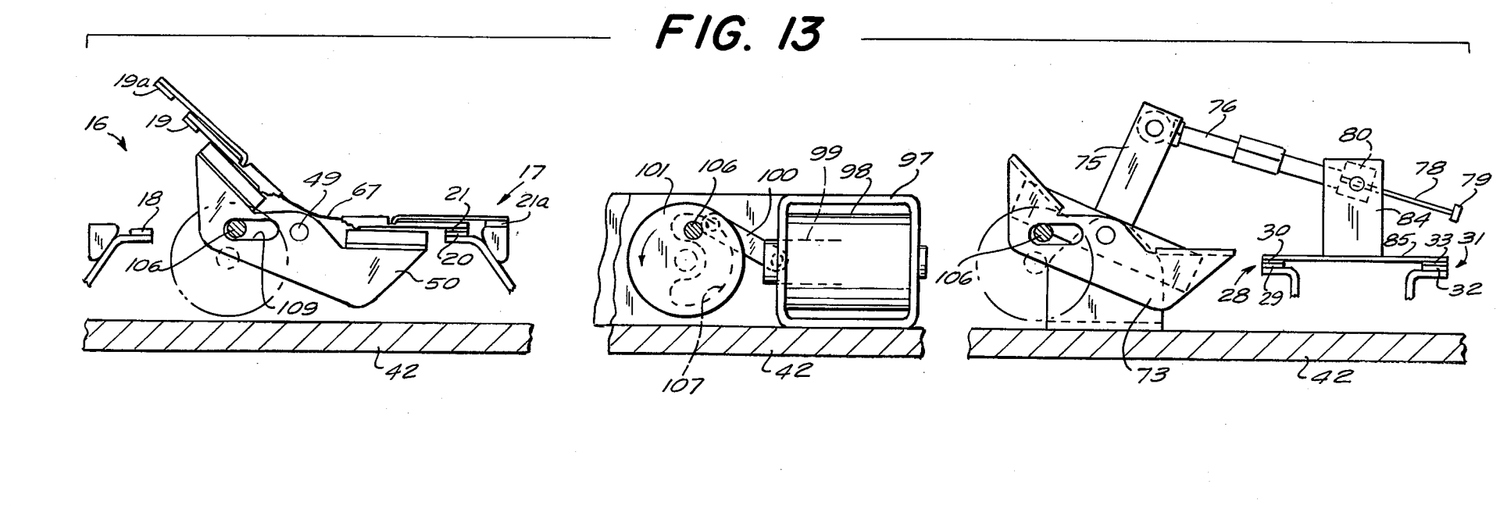
Figure 14:
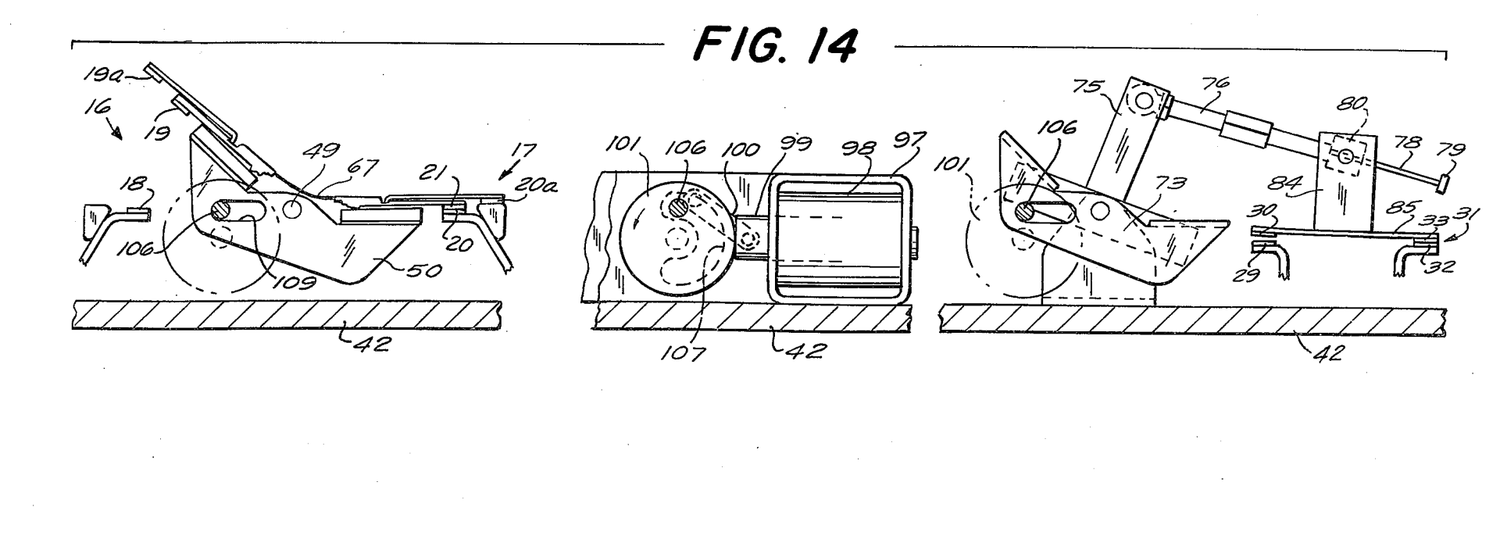

Upon deenergization of solenoid 98, the inertia of weight 101 carries the weight to the position shown in FIG. 13. Pin 36 moving in slot 109 of arm 50 now causes phase switches 17 to close. At the same time, movement of pin 106 within slot 108 of arm 73 causes the end 81 of rod 76 to engage bearing block 80. However, rod 76 does not yet move the bearing block, and hence neutral switches 28 and 31 remain closed. During the very last portion of the movement of weight 101, to the position shown in FIG. 14, switches 16 remain open and switches 17 remain closed. However, the end 81 of rod 76 pushing against bearing block 80 causes bar 85 to be pivoted about its rightward end causing movable contact 30 to be lifted away from stationary contact 29, thereby opening neutral switch 28. When solenoid 98 is energized again for an instant, the parts will move through exactly the same steps described above, but in reverse order.

It may be mentioned that the spacing between head 79 and bearing block 80 can be adjusted by threading pin 78 more or less into rod 76. Also, the spacing between rod end 81 and bearing block 80 can be adjusted by threading eyelet 69 more or less into rod 76.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. An automatic transfer switch for transferring an electrical load from a normal source of electric power to an emergency source of electric power, and vice versa, comprising:
    a. a first set of phase switches for connection between the normal source and a load,
    b. a second set of phase switches for connection between the emergency source and the load,
    c. a first neutral switch for connection between a normal source neutral conductor and the load neutral conductor,
    d. a second neutral switch for connection between an emergency source neutral conductor and the load neutral conductor, e. means for operating said phase switches so that only one of said sets of phase switches is closed at any one time and for opening the closed set before closing the open set when transferring the load from one of the power sources to the other, and f. means for operating said neutral switches so that prior to operation of said phase switches by said means (e) the neutral switch corresponding to the closed set of phase switches is closed and the neutral switch corresponding to the open set of phase switches is open, and during transfer of the load both of said neutral switches are closed before the closed set of phase switches open and both of said neutral switches remain closed until after the closed set of phase switches open and the open set of phase switches close, whereupon the neutral switch which had originally been open remains closed and the neutral switch which had originally been closed opens.

2. An automatic transfer switch as defined in claim 1 wherein said means (f) moves between two extreme positions when the load is transferred from one power source to the other, said means (f) opening the first neutral switch and closing the second neutral switch when in one extreme position and opening the second neutral switch and closing the first neutral switch when in the other of its extreme positions, both neutral switches being closed when said means (f) is between its two extreme positions.

3. An automatic transfer switch as defined in claim 2 including resilient means constantly biasing each of said neutral switches to its closed position, said means (f) maintaining a different one of said neutral switches open against the force of its respective resilient means when in each of its extreme positions.

4. An automatic transfer switch as defined in claim 1 wherein each of said neutral switches includes a stationary contact member and a movable contact member, said stationary contact members being spaced apart, and including a single bar carrying both of said movable contact members, said bar bridging the space between said stationary contact members when both neutral contacts are closed.

5. An automatic transfer switch as defined in claim 4 wherein said bar is formed of electrically conductive material.

6. An automatic transfer switch as defined in claim 4 including a bearing member having an opening carried by said bar, and wherein said means (f) includes a rod slidable within said opening between two extreme positions, said rod carrying two abutments spaced apart along its length and on opposite sides of said bearing member, and a different one of said abutments engaging said bearing member in each extreme position of said rod to move said bar and separate the movable and stationary contacts of one of said neutral switches without separating the contacts of the other neutral switch.

7. An automatic transfer switch as defined in claim 6 including means for adjusting the spacing between said abutments.

8. An automatic transfer switch as defined in claim 4 including two parallel stationary posts, one of said posts being adjacent to each of said stationary contacts, and two holes in said bar slidably accommodating said posts, an enlargement on each post spaced from the side of said bar opposite that which carries said movable contacts, and a compression spring between each enlargement and said bar for constantly biasing said movable contacts toward said stationary contacts.

9. An automatic transfer switch as defined in claim 1 including linkage means interconnecting said operating means (e) and said operating means (f) so that both operating means move in unison.

10. An automatic transfer switch as defined in claim 9 including a single actuating means for controlling both said operating means (e) and said operating means (f).

11. An automatic transfer switch as defined in claim 10 wherein said actuating means is electrically operated.

12. An automatic transfer switch as defined in claim 11 wherein said actuating means is a solenoid.

* * * * *